United States Patent [19]
Caldwell et al.

[11] Patent Number: 4,933,044
[45] Date of Patent: Jun. 12, 1990

[54] VACUUM FITTINGS AND RUBBER BAND SEAL

[75] Inventors: John E. Caldwell, Kent; Lap B. Quach, Tacoma, both of Wash.

[73] Assignee: The Boeing Company, Seattle, Wash.

[21] Appl. No.: 289,377

[22] Filed: Dec. 23, 1988

[51] Int. Cl.⁵ .............................................. B32B 31/20
[52] U.S. Cl. .................................... 156/556; 156/285; 156/286; 156/580
[58] Field of Search .................... 156/285, 286, 382; 249/178, 141; 264/102, 510; 100/90

[56] References Cited
U.S. PATENT DOCUMENTS 4,530,138  7/1985  Ritter .............................. 156/285 X Primary Examiner—Michael W. Ball
Assistant Examiner—Michele K. Yoder
Attorney, Agent, or Firm—Bruce A. Kaser

[57] ABSTRACT

The invention disclosed herein is a combination of hardware fittings and an elastomeric peripheral seal which are used to bond two halves of a single beam together. The beam has transverse openings extending through its width when its halves are joined. The fittings cover opposite ends of each beam opening and essentially convert each into a vacuum chamber. The peripheral seal surrounds the interface between the beam's halves. A vacuum is drawn through both the fittings and the peripheral seal, thus drawing a vacuum along the interface of the halves as they are bonded.

10 Claims, 2 Drawing Sheets

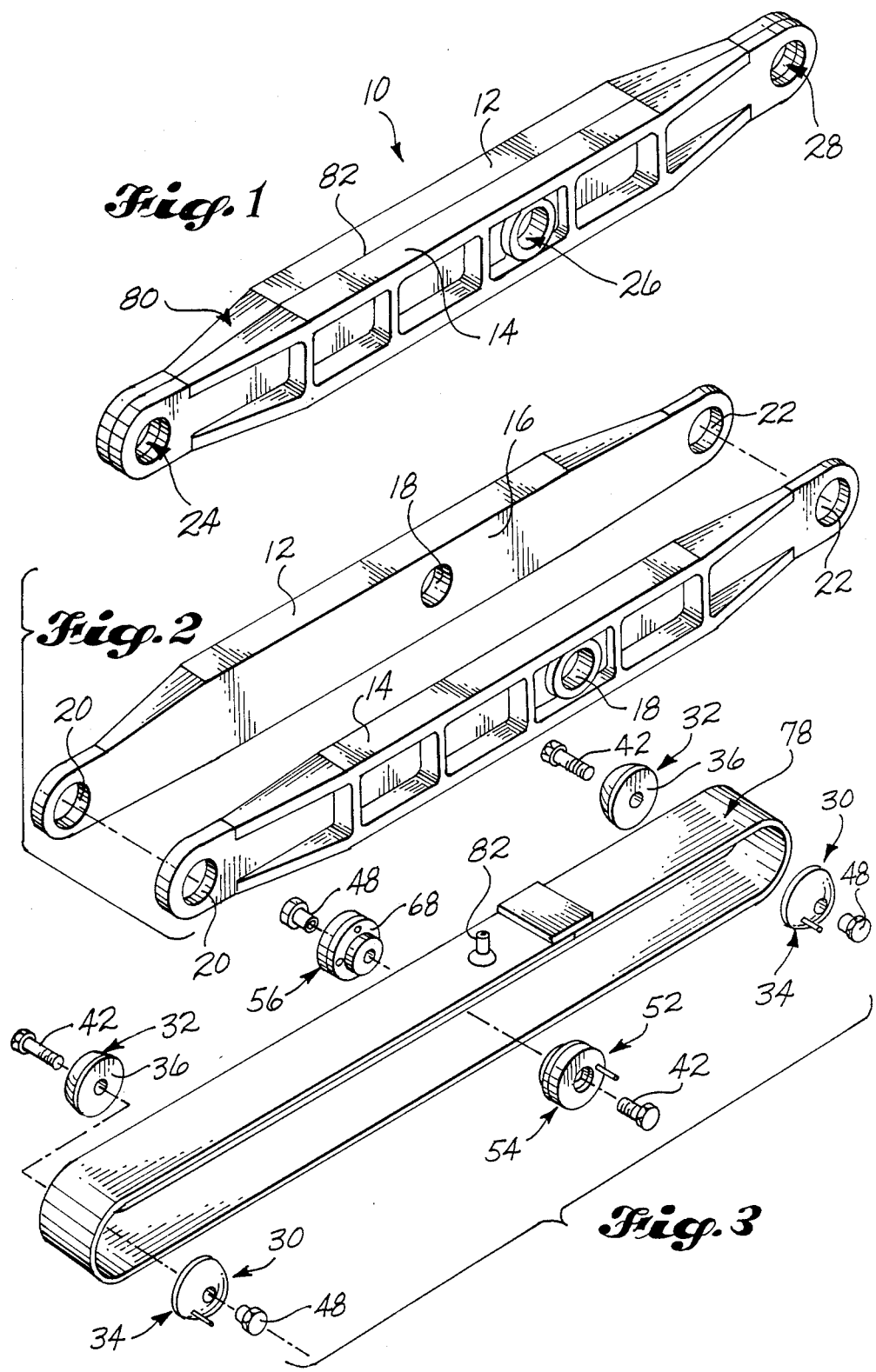

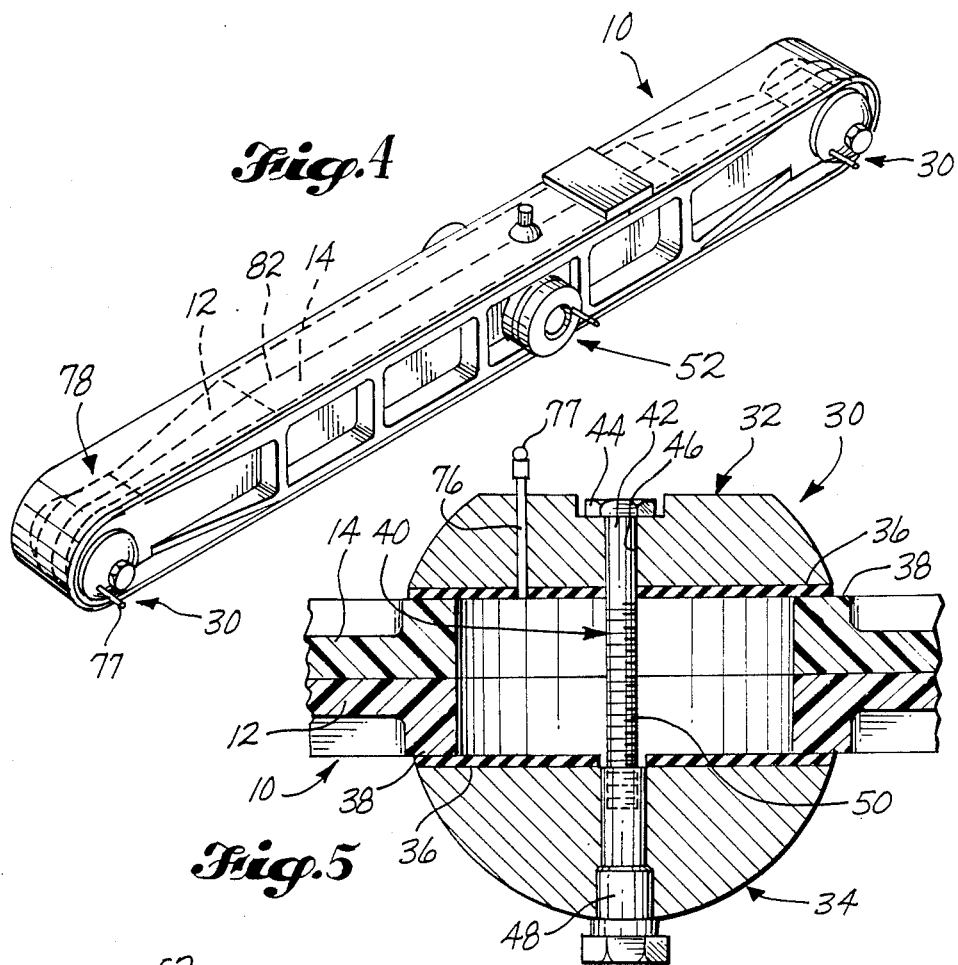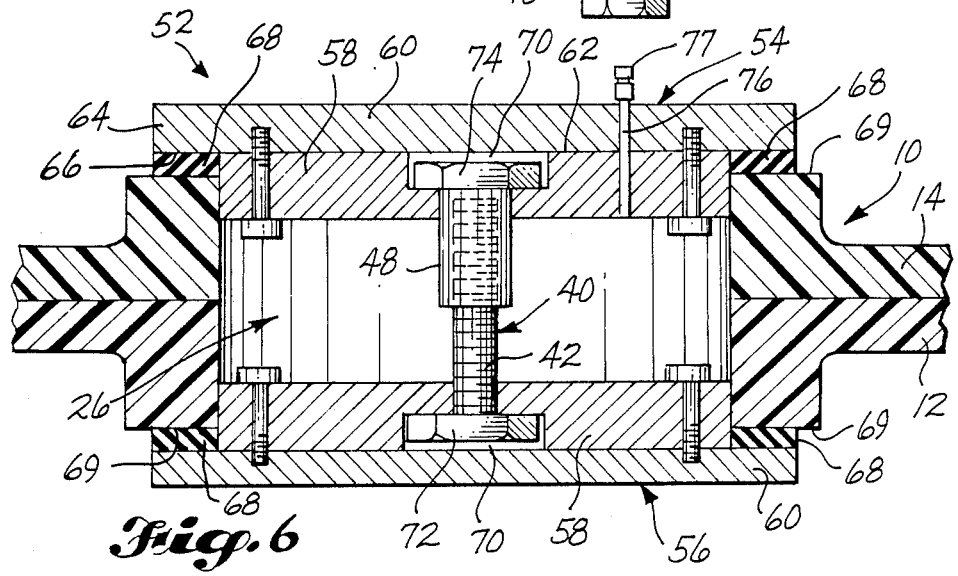

VACUUM FITTINGS AND RUBBER BAND SEAL

Technical Field

This invention generally relates to vacuum fittings which are used to draw a vacuum from or evacuate certain areas during the formation of certain structural components. More particularly, the invention relates to the use of vacuum fittings in the construction of aircraft components.

Background Art

In certain aircraft, the main landing gear beam is produced by bonding together two symmetric subcomponent halves or subassemblies. Typically, the beam is an elongated member that has three transverse openings or bores, one on each end, and a third in the center. These openings are formed in each subcomponent half before they are placed together. As they are joined, their respective openings come into registration thereby providing bore openings which extend all the way through the beams' transverse width.

The beams' halves are joined by pressure-forming techniques in combination with the use of a thermosetting bonding adhesive. Briefly, the adhesive is first applied to the bonding surface of each half. Thereafter, the halves are placed together and, in the past, separate nylon vacuum bags were placed over each transverse opening with still another nylon bag being placed around the peripheral bond line between the halves. This made a total of four separate bags, each of which was evacuated by using conventionally known vacuum fittings.

After bagging, the beam was placed in an autoclave and subjected to elevated temperatures and pressures while at the same time the bags were evacuated. The pressure in the autoclave, in combination with the vacuum drawn through the fittings, pulled the beam's halves together as the adhesive set.

The problem with the above arrangement was that a separate set of bags had to be constructed for each beam produced, and further, the bags tended to perform poorly for their intended purpose. The present invention eliminates the use of vacuum bags for the beams' openings and further provides a reusable peripheral seal. The advantages associated with this will become self-evident upon consideration of the following description.

Disclosure of the Invention

The present invention is designed to be applied in situations where to subassemblies are joined together to produce a single assembly. As was described above, each subassembly has a bonding surface that is placed against a like surface of the other as they are joined. The perimeters of the bonding surfaces are co-extensive when the assembly is formed. That is, they are congruent and match each other. Their perimeters essentially define the periphery of the finished assembly.

Each subassembly has at least one opening extending through its transverse width. As the subassemblies are placed together, their respective openings register thus providing a single opening through the entire width of the assembly. Of course, more than one opening may be provided in the assembly depending on the number of openings in the subassemblies.

The present invention provides a vacuum fitting adapted to convert this opening into a vacuum chamber so that an internal vacuum may be drawn along the interface of the two subassemblies. Also, a reusable elastomeric seal is placed peripherally around the interface and is used to externally draw a vacuum along the assembly's bond line.

The fitting comprises a first member or half which covers one open end of the assembly's transverse opening. A second member or half covers the other end. A bolt assembly extending through the opening interconnects the two halves. Tightening the bolt assembly draws the halves toward each other, thus sealing the opening. At least one fitting member or half has a vacuum passageway in communication with a conventional vacuum fitting to provide a means for evacuating the sealed space created by the fitting.

Brief Description of the Drawings

In the drawings, like reference numerals and letters refer to like parts throughout the various views, and wherein:

FIG. 1 is a pictorial view of a completed main landing gear beam;

FIG. 2 is an exploded view of the beam shown in FIG. 1 and shows how its two halves are placed together to form the beam;

FIG. 3 is an exploded pictorial view showing placement locations of vacuum fittings constructed in accordance with the invention in transverse openings in the beam of FIGS. 1 and 2, and shows an elastomeric peripheral seal;

FIG. 4 is a view like FIG. 1 but shows the fittings and seal of FIG. 3 placed in and on the beam for joining the beam's halves together;

FIG. 5 is a cross-sectional view showing one embodiment of a vacuum fitting in accordance with the invention; and FIG. 6 is a view like FIG. 5 but shows a second embodiment.

Best Mode for Carrying out the Invention

In the drawings, and referring first to FIGS. 1 and 2, therein is shown at 10 a main landing gear beam or assembly. The beam 10 consists of two halves or subassemblies 12, 14. Each subassembly 12, 14 has a bonding surface 16 which is attached to a like surface of the other. Both subassemblies 12, 14 have a central opening 18 and opposite end openings 20, 22. When the halves are joined together, openings 18, 20, 22 come into registration and provide a single opening or bore that extends through the beam's entire transverse width at each respective location, as is indicated generally by arrows 24, 26 and 28.

A vacuum fitting constructed in accordance with the invention closes and seals each opening 24, 26, 28, thereby creating a sealed chamber or space excepting the interface between beam halves. FIG. 5 shows at 30 one fitting embodiment, which may be used to close bores 24, 28. This embodiment has first and second members 32, 34, or halves, which are positioned on each side of the beam 10. Each half 32, 34 covers the end opening on its side of its respective bore and has a seal 36 which abuts against the area 38 that circumferentially surrounds the opening.

The two halves are drawn together by a bolt assembly which is indicated generally at 40. This assembly 40 includes a bolt 42 having a head 44 fixedly connected to one half 32 of the fitting. Preferably, the head 44 is welded to the fitting so that no air may pass between the bolt 42 and a bore 46 through which it extends. In the other fitting half 34 is a nut member 48 or nut which is also welded to half 34 in a manner so as to prevent air leakage.

The bolt 42 has a threaded end portion 50 which engages with internal threads (not shown) in the nut 48. In the FIG. 5 embodiment, the bolt and nut cannot turn relative to their respective half of fitting 30. Therefore, the fitting halves 32, 34 are joined and tightened against beam 10 by simply spinning one fitting relative to the other until seal 36 is tight against area 38. It should be appreciated, however, it is conceivable that a different kind of arrangement could be constructed where the bolt assembly itself is tightened instead of actually spinning the halves.

A second fitting embodiment, which is shown at 52 in FIG. 6, is preferably used to seal the beam's center bore 26. This fitting also has separate halves 54, 56 on each side of the beam. However, in this embodiment each half is constructed of two separate pieces 58, 60. One piece 58 is a cylindrical plug which is slidingly received in bore space 26. Attached to its outer surface 62 is a circular plate 64. This latter plate 64 has a diameter that is greater than the diameters of both the plug 58 and the diameter of bore 26. This provides an inwardly-facing annular shoulder 66 to which an annular seal 68 is attached. As with the fitting shown in FIG. 5, this seal 68 tightly abuts against the area 69 (same as area 38 in FIG. 5) which immediately surrounds the bore's end opening.

An outwardly-opening recess 70 is provided in plug 58 which is covered by plate 60 to define a closed space. Like the embodiment shown in FIG. 5, a bolt assembly 40 connects the two halves 54, 56 of fitting 52 together. In one half 54, however, the head 72 of the bolt is received in space 70 while a head portion 74 of the nut is received in a similar space 70 in the other half 56. By nonlimiting example, the space 70 is shaped so that neither the nut or bolt head can turn relative to either half. As with fitting 30 in FIG. 5, the halves are therefore tightened together by simply spinning one half relative to the other until seal 68 is tight against surface 69.

The fittings shown in FIGS. 5 and 6 both have a vacuum line or passageway 76 which connects the sealed bore to a vacuum line 77 for evacuation.

After the fittings 30, 32 are attached to the beam, an elastomeric seal 78 is stretched around the periphery 80 of the beam and covers the interface or bond line 82 defined by the perimeter of bonding surface 16. The seal 78 has a conventional vacuum fitting 82.

As would be familiar to a person skilled in the art, the beam 10 is formed in an autoclave at elevated temperatures and pressures. Before the beam's halves are joined together, their bonding surfaces 16 are first coated with a thermosetting adhesive. Then, the vacuum fittings are attached to the beam in the manner shown in FIGS. 5 and 6 followed by placement of the elastomeric peripheral seal 78.

The beam's halves are compressed together by a combination of the external pressure provided by the autoclave and the internal vacuum which is drawn by the fittings through bores 24, 26, 28, and the externally drawn vacuum which is provided by the peripheral seal 78. It should be appreciated that the particular fitting embodiment shown in FIG. 6, which was described above for use in connection with sealing the beam's center bore 26, could also be used in either one of the end bores 24, 28. It is also conceivable that the fittings shown in FIG. 5 could be used in the center bore 26 in certain applications.

It is to be understood that certain changes to the fittings and seals as described above could be made without departing from the spirit and scope of the invention. As mentioned above, it is conceivable that the fittings' bolt assemblies 40 could be altered so that it is the bolts themselves which are tightened instead of creating a tightening action by spinning one fitting half relative to the other.

An advantage to the invention is that the fittings are reusable hard tools. Accordingly, they can be used over and over again to fabricate more than one beam assembly, which significantly reduces fabrication costs over and above past methods employing non-reusable vacuum bags. The peripheral seal 78, which is preferably made of silicon rubber, is also reusable.

It is to be further understood that the preceding description is not to be taken in a limiting sense, but rather is to be used only to interpret the scope and content of the patent claims which follow. As has been well-established by the statutory law and court decisions, it is the claims and not the patent specification which define the scope of patent protection available to the applicant.

What is claimed is:

1. An apparatus for use in joining a first and second subassembly together to form an assembly, said subassemblies being characterized in that each makes up one half of said assembly, and each has a bonding surface that is placed against a like surface of the other, and the perimeters of said surfaces are substantially congruent and match each other when said subassemblies are joined together, and each subassembly has at least one opening extending from said bonding surface to an outer surface on the opposite transverse side of said subassembly, said openings being in registration with each other when said subassemblies are joined together to define an open-ended space extending through the transverse width of said assembly, the apparatus comprising:

a vacuum fitting releasably covering opposite ends of said open-ended space, said fitting having a first member releasably covering one open end of said space, and a second member releasably covering the other open end of said space, and having releasable tightening means for drawing said members transversely inwardly toward each other, to seal said space while said subassemblies are being joined together, and at least one of said members having a vacuum passageway for connecting said space to a vacuum line; and p1 an elastomeric seal extending around the periphery of said assembly in a manner so that said seal covers the interface of said bonding surface perimeters when they match each other.

2. The apparatus of claim 1, including means for drawing a vacuum through said elastomeric seal.

3. The fitting of claim 1, wherein said tightening means includes an elongated bolt having a head connected to one of said members, and a body extending from said one member through said sealed space, and a nut having a head portion that is connected to said other member, said bolt's body having an end portion in threaded engagement with said nut.

4. A vacuum fitting for use in joining two subassemblies together to form a single assembly, said subassemblies being characterized in that each has a bonding surface that is placed against a like surface of the other, and each has at least one opening extending from said bonding surface to an outer surface on the opposite transverse side of said subassembly, said openings being in registration with each other when said subassemblies are joined together to form said assembly, to define an open-ended space extending through said assembly, the fitting comprising:

a first member releasably covering one open end of said space and having a sealing surface shaped for flush fitment adjacent an outer surface area immediately surrounding said open end;

a second member releasably covering the other open end of said space and having a sealing surface shaped for slush fitment adjacent an outer surface area immediately surrounding said other open end; and releasable tightening means for drawing said first and second members transversely inwardly toward each other, to seal said space while said subassemblies are being joined together, and wherein at least one of said members includes a vacuum passageway for connecting said sealed space to a vacuum line.

5. The fitting of claim 4, wherein said open-ended space is a cylindrical bore, and wherein each of said first and second members further comprises:

a cylindrically-shaped plug slidingly received in its respective end opening, and a circular plate attached to the outwardly facing end of said plug, said plate having a diameter larger than the diameter of both said end opening and said plug, to define an inwardly facing annular shoulder, and an annular seal connected to said shoulder, said seal abutting against said outer surface area surrounding said open end when said first and second members are drawn toward each other.

6. The fitting of claim 5, wherein said tightening means includes an elongated bolt having a head connected to one of said members, and a body extending from said one member through said sealed space, and a nut having a head portion that is connected to said other member, said bolt's body having an end portion in threaded engagement with said nut.

7. The fitting of claim 6, wherein an outer side of said cylindrical plug has an outwardly opening recess that is closed by the attachment of said circular plate to said plug, and a bore extending inwardly from said closed recess into said space, wherein the head of said bolt is received in said recess of one of said members, and said head portion of said nut is received in said recess of said other member.

8. The fitting of claim 4, wherein said tightening means includes an elongated bolt having a head connected to one of said members, and a body extending from said one member through said sealed space, and a nut having a head portion that is connected to said other member, said bolt's body having an end portion in threaded engagement with said nut.

9. An apparatus for use in joining a first and second elongated subassembly together to form an assembly, said subassemblies being characterized in that each makes upon half of said assembly, and each has a bonding surface that is placed against a like surface of the other, and the perimeters of said surfaces are substantially congruent and match each other when said subassemblies are joined together, and each subassembly has an opening in a central portion thereof and an opening in each end portion thereof on opposite sides of said central opening, each of said openings extending from said bonding surface to an outer surface on the opposite transverse side of said subassembly, said openings through one subassembly being in registration with the openings of the other subassembly when said subassemblies are joined together, in a manner so as to define separate open-ended spaces respectively extending through the transverse width of said assembly's central and end portions, the apparatus comprising:

a vacuum fitting releasably covering opposite ends of each open-ended space, each fitting having a first member releasably covering one end of said fitting's respective space, and a second member releasably covering the other open end of said space, each fitting having releasable tightening means for drawing said first and second members transversely inwardly toward each other, to seal said fitting's respective space while said subassemblies are being joined together, at least one of said members of each fitting having a vacuum passageway for connecting said fitting's respective space to a vacuum line; and an elastomeric seal extending around the periphery of said assembly in a manner so that said seal covers the interface of said bonding surface perimeters when they match each other.

10. The apparatus of claim 9, including means for drawing a vacuum through said elastomeric seal.

* * * * *

UNITED STATES PATENT AND TRADEMARK OFFICE
CERTIFICATE OF CORRECTION

PATENT NO. : 4,933,044

DATED : June 12, 1990

INVENTOR(S) : John E. Caldwell and Lap B. Quach

It is certified that error appears in the above-identified patent and that said Letters Patent is hereby corrected as shown below:

Col. 1, line 52, "to" first occurence should be -- two --.

Claim 1, col. 4, line 52, delete "p1".

Claim 4, col. 5, line 14, "slush" should be -- flush --.

Claim 9, col. 6, line 13, "upon" should be -- up one --.

Signed and Sealed this

Fourth Day of February, 1992

Attest:

HARRY F. MANBECK, JR.

*Attesting Officer*  *Commissioner of Patents and Trademarks*